United States Patent [19]

Caulfield

[11] 4,008,528
[45] Feb. 22, 1977

[54] DRAWING APPARATUS
[76] Inventor: Richard A. Caulfield, 5 Connors Ave., Westerly, R.I. 02891
[22] Filed: Mar. 22, 1976
[21] Appl. No.: 669,148
[52] U.S. Cl. .................................... 35/26; 33/277
[51] Int. Cl.² .................. G09B 11/06; G09B 11/10
[58] Field of Search ............... 35/12 N, 26; 33/277; 350/121; 354/223

[56] References Cited
UNITED STATES PATENTS

| | | | |
|---|---|---|---|
| 691,138 | 1/1902 | Hawley | 35/26 |
| 989,240 | 4/1911 | Folmer | 354/223 |
| 1,514,296 | 11/1924 | McCallum | 33/277 |
| 3,311,017 | 3/1967 | Eckholm | 350/121 X |

Primary Examiner—Harland S. Skogquist
Attorney, Agent, or Firm—Barlow & Barlow

[57] ABSTRACT

A drawing apparatus to assist in providing an artist with a true perspective of the scene viewed on a transparent surface viewed through a fixed eyepiece, the transparent surface being the concave side of a spherical segment encompassing about 60° of arc which approximates the normal cone of vision.

4 Claims, 5 Drawing Figures

U.S. Patent  Feb. 22, 1977  4,008,528
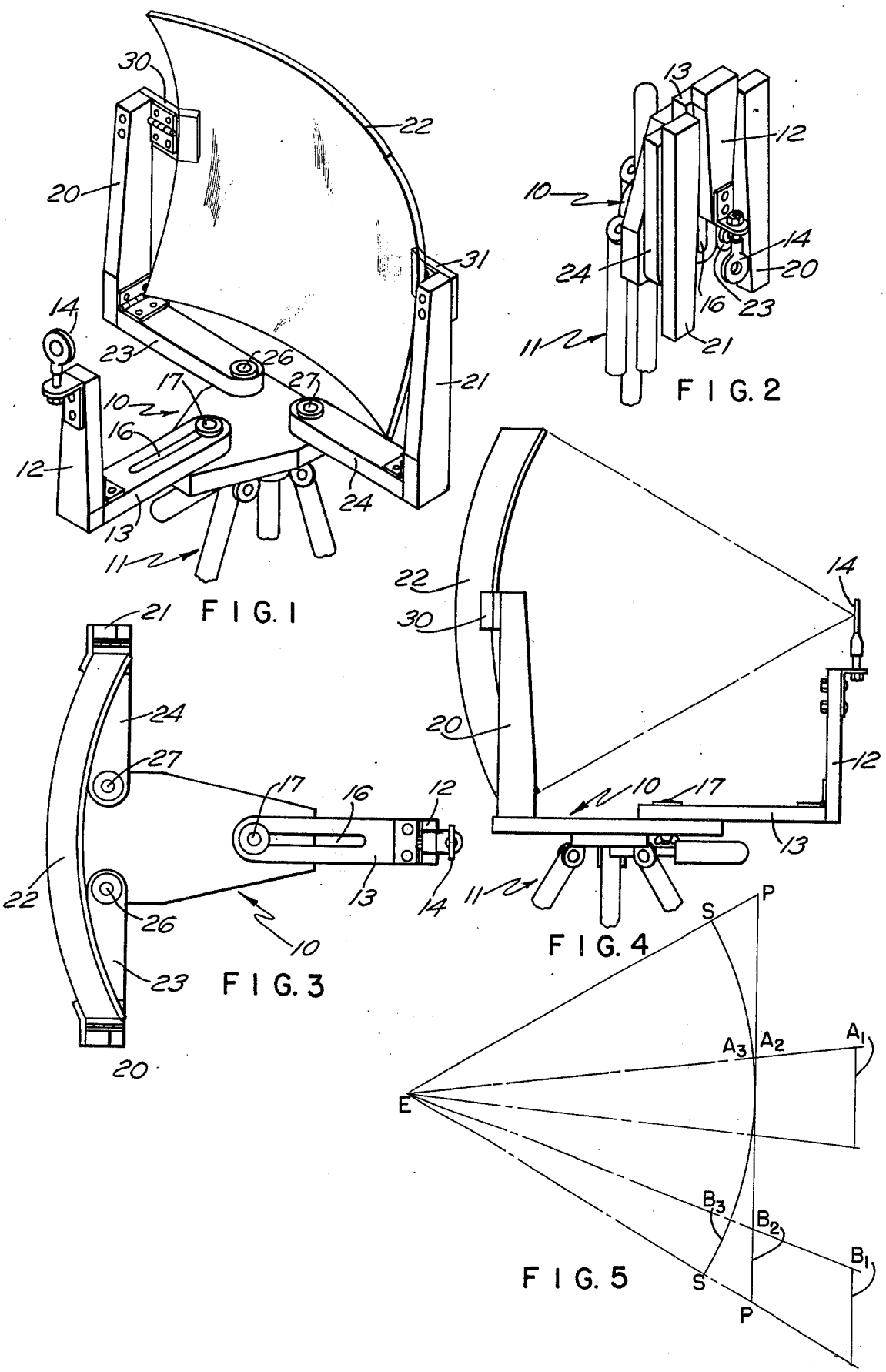

DRAWING APPARATUS

BACKGROUND OF THE INVENTION

For over 100 years drawing apparatuses have been provided with an eyepiece and a marking surface, which marking surface is in a single plane, an early example being shown in U.S. Pat. No. 9,409 of 1852. The eyepiece provides a fixed point for the eye to view some scene through the transparent surface in a single plane but because of the fact that the single plane is provided there is a distortion of a true perspective due to the fact that the distances from the eyepiece to the center of the plane is shorter than the distance from the eyepiece to the edges of the plane. Thus, there is a distortion from a true perspective on the flat plane surface upon which the picture is drawn.

SUMMARY OF THE INVENTION

This invention overcomes the distortion which occurs on a flat plane by providing a concave marking surface in the shape of the concave side of a sphere with the radius of the sphere having the eyepiece as a center from which the scene is viewed so that there will be no distortion on the marking surface due to different distances from the eyepiece.

DESCRIPTION OF THE DRAWINGS

FIG. 1 is a perspective view of a stand showing the eyepiece and the concave spherical surface that provides a marking surface for the scene which is to be depicted;

FIG. 2 is a perspective view of the device in folded position for transport;

FIG. 3 is a top plan view of the device;

FIG. 4 is a side elevation view thereof; and

FIG. 5 is a diagrammatic view showing a comparison of the concave surface and flat surface from a fixed eyepiece.

DESCRIPTION OF THE PREFERRED EMBODIMENT

With reference to the drawings 10 designates generally a platform which may be mounted upon a tripod 11 or may be mounted upon any suitable support. An upright support 12 hinged to a lateral arm 13 mounts an eyepiece 14 at its upper end. This arm may be provided with a slot 16 and secured to the platform 10 by a screw bolt 17 so that its position may be adjustable.

Spaced from this upright support 12 are a pair of upright supports 20, 21 which mount a portion of a transparent spherical surface 22. Lateral arms 23, 24 hingedly support supports 20, 21 respectively. The eyepiece 14 consists of a ring having an open center against which the eye may be placed to view through the transparent spherical surface 22 a scene to be sketched or painted. The spherical surface 22 is on an arc with the eyepiece as its center and is of a length subtending an arc of about 60° which approximates the normal cone of vision of the eye.

The lateral arms 23 and 24 are secured to the platform by screw bolts 26, 27 and as may be readily appreciated, the arms may be rotated and the supports hinged into abutment therewith to the position as seen in FIG. 2. In addition the tripod legs may be swiveled to present a package that is convenient for transport.

In use the spherical surface 22 is mounted on the supports 20, 21 by mounting pads 30, 31 pinned thereto and the device will be aimed at the picture which is to be sketched or painted and with suitable erasable marking devices such as certain pencils or the like, the outline of the scene to be sketched will be drawn upon the concave side of the marking surface 22. A tracing cloth of a pre-molded translucent type will then be laid over the marks placed upon the concave side of the marking surface 22, and by seeing the marks which have been placed on the concave surface, the tracing cloth may be painted to provide the picture desired which will be in the proper perspective. The tracing cloth is then removed with the picture upon it and the markings placed upon the concave side of the marking surface 22 will be removed and for the next picture the steps will be repeated.

The tracing cloth used for the final scene is molded by stretching it smoothly over a form identical to the form of the surface 22. A coating of clear acrylic polymer emulsion is then applied and allowed to dry. The final painting surface will retain the texture of canvas presently used by artists.

In order to show the comparative results obtained on a concave surface and the plane surface, reference is made to FIG. 5 where PP represents a flat plane, SS the spherical surface and E the viewer's eye. A1 and B1 are line segments of equal lengths in the object to be drawn. Directly in front of the eyepiece A2 and A3 are very nearly the same length, and the depiction of A1 on the plane PP would be in the same perspective as on spherical segment SS. However, near the edge of the drawing surface, B1 will appear shorter because it is farther from the viewer's eye. On the flat plane PP, B2 is equal in length to A2 creating a distorted perspective; this is due to the continuously increasing distance between PP and SS. The distance from E to the spherical surface is constant (Radii of the same sphere) so that line B3 appears in correct perspective. In effect, the spherical segment serves as an enlarged projection of the eye. The sketch shows the effect in a horizontal plane; obviously, the same distortion occurs in a vertical plane at the top and bottom of a flat plane and is correspondingly corrected by use of a spherical surface.

I claim:

1. A drawing apparatus comprising an eyepiece, a marking surface through which the scene to be drawn may be viewed, said marking surface being arcuate and substantially equally distant at all areas from said eyepiece, mounting means for holding said eyepiece and marking surface in fixed relation for aiming at the scene to be produced on said marking surface.

2. A drawing apparatus as in claim 1 wherein said mounting means comprises a platform and spaced upright supports, one for said eyepiece and others for supporting said marking surface.

3. A drawing apparatus as in claim 2 wherein one of said upright supports is laterally adjustable.

4. A drawing apparatus as in claim 1 wherein the marking surface is translucent pre-molded tracing cloth primed with a clear plastic-type medium to be suitable as a painting surface.

* * * * *